Aug. 7, 1956     W. G. STOECKICHT     2,757,558
EPICYCLIC SPEED CHANGE AND REVERSING GEAR
Filed Feb. 6, 1952
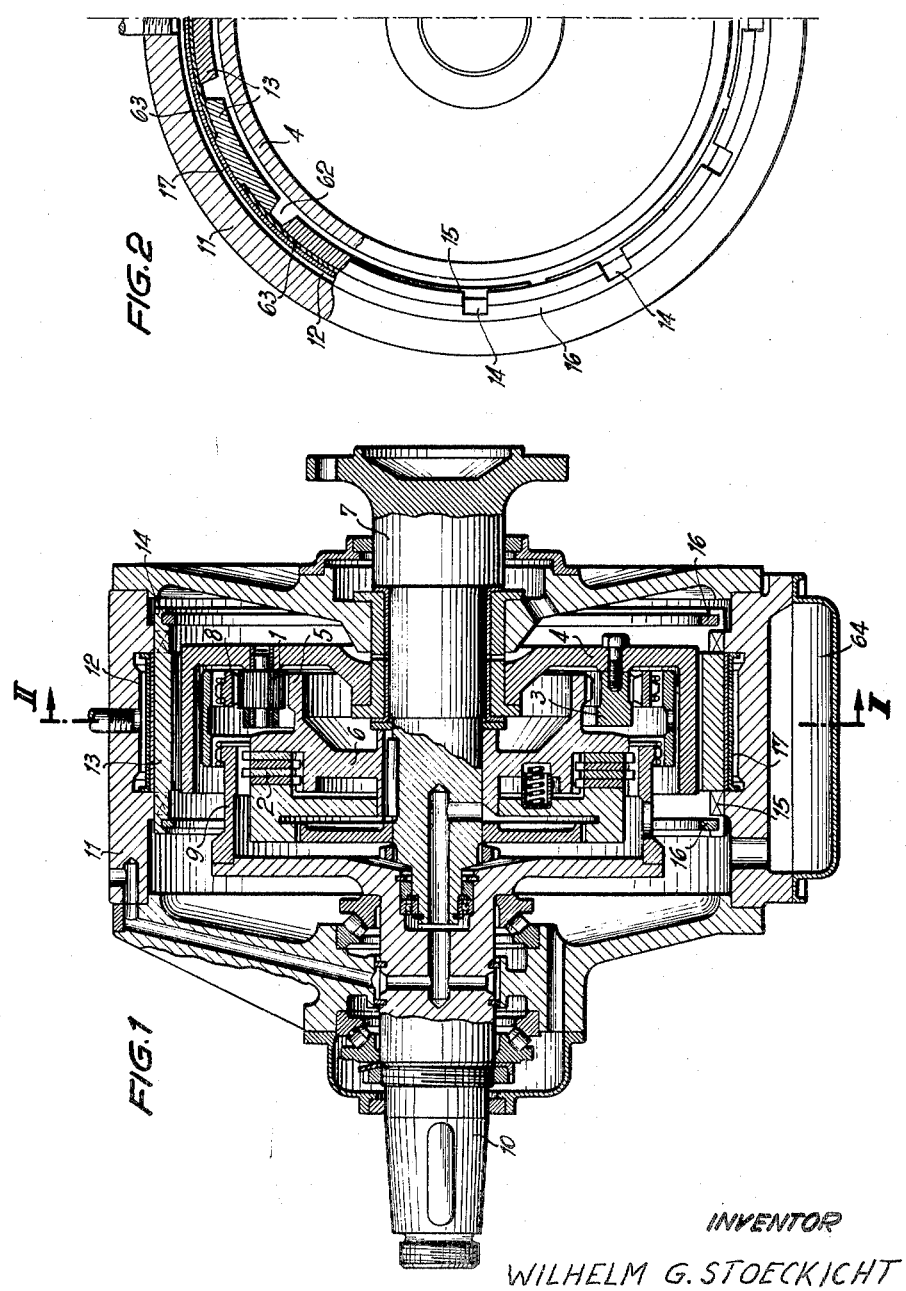
INVENTOR
WILHELM G. STOECKICHT
BY
Harness, Dickey & Pierce
ATTORNEYS

United States Patent Office 2,757,558
Patented Aug. 7, 1956

2,757,558
EPICYCLIC SPEED CHANGE AND REVERSING GEAR

Wilhelm G. Stoeckicht, Munich-Solln, Germany
Application February 6, 1952, Serial No. 270,152
Claims priority, application Germany February 19, 1951

2 Claims. (Cl. 74—792)

This invention relates to epicyclic or planetary speed change and reversing gears and more especially to such gears which will be actuated by hydraulic or pneumatic means.

It is known, and often used, to actuate epicyclic or planetary speed change and reversing gears by means of hydraulically or pneumatically operated brakes which are generally arranged within the gear casing structure thereby, however, definitely increasing the dimensions of the gear.

The invention has for its object to make possible the construction of such an epicyclic or planetary speed change and reversing gear having particularly small dimensions and weight. According to the invention this is effected by providing brakes in the form of cylinder-piston-assemblies, the cylinders of which form at the same time the gear casing. The increased cost of construction of a special gear casing is thus avoided and a valuable reduction in weight and dimension is obtained.

Another object of the invention lies in the provision of an automobile speed change and reversing gear which will operate in a more effective manner and which will have at the same time reduced dimensions and weight and which may be manufactured with a minimum of costs and work.

The above and other objects and features of the invention will appear more fully hereinafter from a consideration of the following description, taken in connection with the accompanying drawings, wherein two embodiments of the invention are illustrated by way of example.

In the drawings

Fig. 1 is a sectional view of a planetary or epicyclic speed change and reversing gear constructed according to the invention, the section is taken along the axis of this gear.

Fig. 2 is a cross section taken along line II—II of Fig. 1.

The speed change and reversing gear shown in Figs. 1 and 2 is provided with a set 1 of epicyclic pinions and a friction clutch 2. The epicyclic pinion carrier 3 for rotatably supporting the epicyclic or planet pinions is connected with the brake disc 4 or is constructed in one piece therewith. The inner central or sun gear 5 and the inner clutch member 6 are connected with the driving shaft 7 while the outer ring gear or annulus 8 and the outer clutch member 9 are connected with the driven shaft 10. The casing or housing 11 embracing the gear is at the same time constructed as a ring cylinder 12 which is closed inwardly by a plurality of radially movable brake shoes 13 guided by projections 14 riding in slots 15 in the casing and which are held away from the brake disc 4 by means of spring rings 16. The ring cylinder 12 is packed with one or more especially elastic collars 17. The drawing also shows how it is possible to secure an oil container 64 to the lower part of the casing 11.

Small interstices 62, which are provided between the individual brake shoes 13 for making possible a radial movement of these shoes without impeding one another are bridged by sheet metal pieces 63. By applying fluid to ring cylinder 12 brake shoes 13 will be brought in frictional engagement with brake drum 4 whereby brake drum 4 and pinion carrier 3 will be held stationary. The gear will now operate as speed changing and reversing gear. By applying fluid pressure to friction coupling 2 however, annulus 8, pinion carrier 3 and sun gear 5 will couple one with another and will rotate as a unit thereby rotating shaft 10 with the same speed and the same direction of rotation as shaft 7.

I claim:

1. In a speed change and reversing epicyclic gearing construction, a casing for rotatably receiving in axial alignment a driving shaft and a driven shaft, a sun gear drivably connected with one of said shafts, a ring gear drivably connected with the other of said shafts, a frictional clutch driving member secured to one of said shafts, a frictional clutch driven member secured to the other of said shafts, said clutch members comprising frictional surfaces extending radially with respect to the axis of said shafts, means for hydraulically actuating said clutch members to cause clutch engagement, said means including a piston and cylinder mounted for relative axial movement, a set of planet gears adapted to mesh both with said sun gear and said ring gear, a planet carrier rotatably arranged within said casing coaxially with respect to the axis of said shafts for rotatably supporting said set of planet gears, means for braking said planet carrier including a braking surface provided thereon, said braking surface forming part of a drum member connected with said planet carrier and encircling said gears and said clutch members, a chamber expansible substantially radially with respect to the axis of said shafts and encircling said drum member, the fixed element of said chamber being formed by an annular U-shaped recess of said casing structure with two parallel walls, a radially movable element having a U-shaped cross-section to fit as a piston member snugly into said U-shaped recess of said chamber, a plurality of equidistantly spaced apart radially guided brake shoes contacting the surface of said element and movable into frictional engagement with said braking surface to produce a plurality of equal frictional forces, resilient means for yieldably holding said radially guided brake shoes out of engagement with said braking surface, and means for supplying fluid pressure to said chamber and to said means for hydraulically actuating said clutch members.

2. The combination according to claim 1, further provided with a plurality of sheet metal bridging pieces in the interstices between said brake shoes.

References Cited in the file of this patent

UNITED STATES PATENTS

| | | |
|---|---|---|
| 901,664 | Tuttle | Oct. 20, 1908 |
| 1,029,610 | Harrington | June 18, 1912 |
| 1,053,918 | Meyer | Feb. 18, 1913 |
| 1,166,479 | Perkins | Jan. 4, 1916 |
| 1,207,606 | Munday | Dec. 5, 1916 |
| 1,274,781 | Rathbun | Aug. 6, 1918 |
| 2,055,325 | Woolson | Sept. 22, 1936 |
| 2,123,769 | Cotal | July 12, 1938 |
| 2,123,770 | Cotal | July 12, 1938 |
| 2,329,724 | Maurer | Sept. 21, 1943 |
| 2,349,494 | Fawick | May 23, 1944 |
| 2,354,257 | Greenlee | July 25, 1944 |
| 2,361,357 | Schmitter | Oct. 24, 1944 |
| 2,371,828 | Kuhns | Mar. 20, 1945 |
| 2,434,761 | Fawick | Jan. 20, 1948 |
| 2,434,762 | Fawick | Jan. 20, 1948 |
| 2,478,869 | Hasbany | Aug. 9, 1949 |
| 2,580,656 | Clerk | Jan. 1, 1952 |
| 2,605,863 | Talboys et al. | Aug. 5, 1952 |
| 2,669,330 | Banker | Feb. 16, 1954 |

FOREIGN PATENTS

| | | |
|---|---|---|
| 692,519 | Great Britain | Feb. 16, 1951 |